United States Patent
Carter et al.

(10) Patent No.: US 9,841,819 B2
(45) Date of Patent: Dec. 12, 2017

(54) PERCEPTIONS IN A HAPTIC SYSTEM

(71) Applicant: Ultrahaptics IP Ltd, Bristol (GB)

(72) Inventors: Thomas Andrew Carter, Bristol (GB); Benjamin John Oliver Long, Bristol (GB); Sriram Subramanian, Hove (GB); Robert Charles Blenkinsopp, Bristol (GB); Sue Ann Seah, Bristol (GB); William Thierry Alain Frier, Brighton (GB)

(73) Assignee: ULTRAHAPTICS IP LTD, Bristol (GB)

( * ) Notice: Subject to any disclaimer, the term of this patent is extended or adjusted under 35 U.S.C. 154(b) by 114 days.

(21) Appl. No.: 15/047,757

(22) Filed: Feb. 19, 2016

(65) Prior Publication Data

US 2016/0246374 A1     Aug. 25, 2016

Related U.S. Application Data

(60) Provisional application No. 62/118,560, filed on Feb. 20, 2015, provisional application No. 62/193,234, (Continued)

(51) Int. Cl.
G06F 3/01 (2006.01)
G06F 3/16 (2006.01)
H04R 1/40 (2006.01)

(52) U.S. Cl.
CPC .............. *G06F 3/016* (2013.01); *G06F 3/16* (2013.01); *G06F 3/167* (2013.01); *H04R 1/403* (2013.01); *H04R 2217/03* (2013.01)

(58) Field of Classification Search
CPC . G06F 3/016; G06F 3/16; G06F 3/167; G06F 3/0436; H04R 1/403
(Continued)

(56) References Cited

U.S. PATENT DOCUMENTS

| | | | |
|---|---|---|---|
| 4,218,921 A | 8/1980 | Oran et al. | |
| 6,503,204 B1 | 1/2003 | Sumanaweera et al. | |

(Continued)

FOREIGN PATENT DOCUMENTS

| | | |
|---|---|---|
| GB | 2464117 | 4/2010 |
| GB | 2513884 | 11/2014 |

(Continued)

OTHER PUBLICATIONS

Pompei, F.J. (2002), "Sound from Ultrasound: The Parametric Array as an Audible Sound Source", Massachusetts Institute of Technology.

(Continued)

*Primary Examiner* — Fred Tzeng
(74) *Attorney, Agent, or Firm* — Koffsky Schwalb LLC; Mark I. Koffsky

(57) ABSTRACT

A system providing various improved perceptions techniques for haptic feedback above interactive surfaces that require no contact with either tools, attachments or the surface itself is described. A range of receptors in a perceiving member which is part of the human body is identified to create substantially uniformly perceivable feedback. A vibration frequency that is in the range of the receptors in the perceiving member is chosen and dynamically altered to create substantially uniformly perceivable feedback throughout the receiving member.

31 Claims, 2 Drawing Sheets

Related U.S. Application Data filed on Jul. 16, 2015, provisional application No. 62/206,393, filed on Aug. 18, 2015, provisional application No. 62/275,216, filed on Jan. 5, 2016.

(58) Field of Classification Search
USPC .......................................................... 345/156
See application file for complete search history.

(56) References Cited

U.S. PATENT DOCUMENTS

| | | | |
|---|---|---|---|
| 7,225,404 | B1 | 5/2007 | Zilles et al. |
| 8,884,927 | B1* | 11/2014 | Cheatham, III ...... G06F 3/0436 178/18.04 |
| 9,208,664 | B1 | 12/2015 | Peters et al. |
| 9,612,658 | B2* | 4/2017 | Subramanian .......... G06F 3/016 |
| 2009/0093724 | A1* | 4/2009 | Pernot ...................... A61N 7/02 600/459 |
| 2010/0013613 | A1 | 1/2010 | Weston |
| 2010/0262008 | A1* | 10/2010 | Roundhill ................ A61B 8/00 600/453 |
| 2011/0051554 | A1 | 3/2011 | Varray et al. |
| 2011/0199342 | A1 | 8/2011 | Vartanian et al. |
| 2011/0310028 | A1* | 12/2011 | Camp, Jr. ............. G06F 3/0436 345/173 |
| 2012/0063628 | A1 | 3/2012 | Rizzello |
| 2012/0229401 | A1* | 9/2012 | Birnbaum ............... G06F 3/016 345/173 |
| 2012/0299853 | A1* | 11/2012 | Dagar ..................... G06F 3/016 345/173 |
| 2012/0315605 | A1 | 12/2012 | Cho |
| 2013/0035582 | A1* | 2/2013 | Radulescu ............... A61N 7/02 600/411 |
| 2014/0168091 | A1 | 6/2014 | Jones |
| 2015/0066445 | A1 | 3/2015 | Lin et al. |
| 2015/0130323 | A1 | 5/2015 | Harris et al. |
| 2015/0192995 | A1 | 7/2015 | Subramanian et al. |
| 2015/0220199 | A1* | 8/2015 | Wang ........................ G06F 3/16 345/173 |
| 2015/0304789 | A1* | 10/2015 | Babayoff ............... H04R 1/403 381/303 |
| 2016/0249150 | A1 | 8/2016 | Carter et al. |
| 2017/0004819 | A1* | 1/2017 | Ochiai ................... G10K 15/00 |

FOREIGN PATENT DOCUMENTS

| | | |
|---|---|---|
| GB | 2530036 | 3/2016 |
| JP | 201248378 | 3/2012 |
| KR | 20130055972 | 5/2013 |
| WO | 96/39754 | 12/1996 |

OTHER PUBLICATIONS

Hasegawa, K. and Shinoda, H. (2013) "Aerial Display of Vibrotactile Sensation with High Spatial-Temporal Resolution using Large Aperture Airbourne Ultrasound Phased Array", University of Tokyo.
Hoshi, T. et al. (2010), "Noncontrast Tactile Display Based on Radiation Pressure of Airbourne Ultrasound", IEEE Transactions on Haptics, vol. 3, No. 3.
Yoshino, K. and Shinoda, H. (2013), "Visio Acoustic Screen for Contactless Touch Interface with Tactile Sensation", University of Tokyo.
Kamakura, T. and Aoki, K. (2006) "A Highly Directional Audio System using a Parametric Array in Air" WESPAC IX 2006.
Alexander, J. et al. (2011), "Adding Haptic Feedback to Mobile TV".
Carter, T. et al. (2013) "Ultrahaptics: Multi-point Mid-Air Haptic Feedback for Touch Surfaces" UIST.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Search Report for GB1308274.8 dated Nov. 11, 2013.
Search Report for PCT/GB2014/051319 dated Jul. 28, 2014.
Gavrilov L R Et al (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Iwamoto et al. (2006), Two-dimensional Scanning Tactile Display using Ultrasonic Radiation Pressure, Symposium of Haptic Interfaces for Virtual Environment and Teleoperator Systems, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015.
IPRP for PCT/GB2014/051319 dated Nov. 10, 2015.
Search Report for GB1415923.0 dated Mar. 11, 2015.
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems. (pp. 2185-2188).
Obrist et al., Talking about Tactile Experiences, CHI 2013, Apr. 27-May 2, 2013.
Long et al. Rendering Volumetric Haptic Shapes in Mid-Air using Ultrasound, ACM Transactions on Graphics Proceedings of SIG-GRAPH Asia), vol. 33, No. 6, Article 181.
Freeman et al., Tactile Feedback for Above-Device Gesture Interfaces: Adding Touch to Touchless Interactions ICMI'14, Nov. 12-16, 2014, Istanbul, Turkey.
Obrist et al., Emotions Mediated Through Mid-Air Haptics, CHI 2015, Apr. 18-23, 2015, Seoul, Republic of Korea.
Wilson et al., Perception of Ultrasonic Haptic Feedback on the Hand: Localisation and Apparent Motion, CHI 2014, Apr. 26-May 1, 2014, Toronto, Ontario, Canada.
Phys.org, Touchable Hologram Becomes Reality, Aug. 6, 2009, by Lisa Zyga.
Iwamoto et al., Airborne Ultrasound Tactile Display: Supplement, The University of Tokyo 2008.
Hoshi, T., Development of Aerial-Input and Aerial-Tactile-Feedback System, IEEE World Haptics Conference 2011, p. 569-573.
EPSRC Grant summary EP/J004448/1 (2011).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Eurohaptics Conference and Symposium on Haptic Interfaces for Virtual Environment and Teleoperator Systems 2009.
Tom Nelligan and Dan Kass, Intro to Ultrasonic Phased Array.
Light, E.D., Progress in Two Dimensional Arrays for Real Time Volumetric Imaging, 1998.
Casper et al., Realtime Control of Multiple-focus Phased Array Heating Patterns Based on Noninvasive Ultrasound Thermography, IEEE Trans Biomed Eng. Jan. 2012 ; 59(1): 95-105.
Hoshi, T., Touchable Holography, SIGGRAPH 2009, New Orleans, Louisiana, Aug. 3-7, 2009.
Sylvia Gebhardt, Ultrasonic Transducer Arrays for Particle Manipulation.
Marshall et al., Ultra-Tangibles: Creating Movable Tangible Objects on Interactive Tables, CHI'12, May 5-10, 2012, Austin, Texas.
Marzo et al., Holographic acoustic elements for manipulation of levitated objects, Nature Communications DOI: 10.1038/ncomms9661 (2015).
Search report and Written Opinion of ISA for PCT/GB2015/050417 dated Jul. 8, 2016.

(56) References Cited

OTHER PUBLICATIONS

Search report and Written Opinion of ISA for PCT/GB2015/050421 dated Jul. 8, 2016.
Martinez-Graullera et al., 2D array design based on Fermat spiral for ultrasonic imaging, Ultrasonics 50 (2010) 280-89.
Search Report for PCT/GB2017/050012 dated Jun. 8, 2017.

* cited by examiner

PERCEPTIONS IN A HAPTIC SYSTEM

RELATED APPLICATION

This application claims the benefit of the following four U.S. Provisional patent applications, all of which are incorporated by reference in their entirety:
1. Ser. No. 62/118,560, filed on Feb. 20, 2015.
2. Ser. No. 62/193,234, filed on Jul. 16, 2015.
3. Ser. No. 62/206,393, filed on Aug. 18, 2015.
4. Ser. No. 62/275,216, filed on Jan. 5, 2016.

FIELD OF THE DISCLOSURE

The present disclosure relates generally to improved perception techniques in haptic-based systems.

BACKGROUND

Multi-touch surfaces have become common in public settings, with large displays appearing in hotel lobbies, shopping malls and other high foot traffic areas. These systems are able to dynamically change their interface allowing multiple users to interact at the same time and with very little instruction.

There are situations when receiving haptic feedback before touching the surface would be beneficial. These include when vision of the display is restricted, such as while driving, and when the user doesn't want to touch the device, such as when their hands are dirty. Providing feedback above the surface would also allow for an additional information channel alongside the visual.

A mid-air haptic feedback system creates tactile sensations in the air. One way to create mid-air haptic feedback is using ultrasound. A phased array of ultrasonic transducers is used to exert an acoustic radiation force on a target. This continuous distribution of sound energy, which will be referred to herein as an "acoustic field", is useful for a range of applications, including haptic feedback.

Accordingly, a system that provides various improved perceptions techniques for haptic feedback above interactive surfaces and requires no contact with either tools, attachments or the surface itself is desirable.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
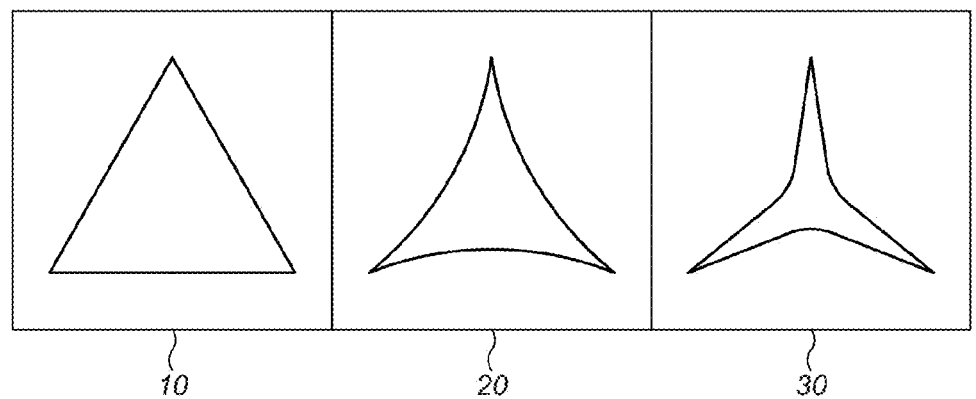
FIG. 1 is a representation of shapes made in a haptic system.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

I. Challenges of Creating Acoustic Fields in Haptic Systems

It is known to control an acoustic field by defining one or more control points in a space within which the acoustic field may exist. Each control point is assigned an amplitude value equating to a desired amplitude of the acoustic field at the control point. Transducers are then controlled to create an acoustic field exhibiting the desired amplitude at each of the control points.

A. Human Hand Properties

Vibration is detected by mechanoreceptors within the skin. The mechanoreceptors within the skin are responsive to vibrations in the range 0.4 Hz to 500 Hz. The emitted ultrasound may be modulated in order to create vibrations within the optimum frequency range detectable by the human hand. By changing the modulation frequency, it may also change the frequency of the vibration on the hand and this can be used to create different tactile properties. Modulating different focal points at different frequencies can give each point of feedback its own independent "feel". In this way it is possible to correlate haptic and visual feedback and also attach meaning to noticeably different textures so that information can be transferred to the user via the haptic feedback.

Specifically, when human skin interacts with the acoustic field, vibrations of the skin are interpreted by mechanoreceptors being excited and sending signals to the brain via the nervous system. For example, the palmar surface of the hand has 4 different types of mechanoreceptors, each of which responds to a different range of frequencies. The force required to trigger each of these receptors varies with the frequency of the vibration. For example, the Pacinian corpuscle has its lowest activation threshold at around 200 Hz, while the Meissner corpuscle is most sensitive between 10-50 Hz.

These receptors are distributed in differing densities throughout the skin. For example, a 200 Hz vibration will not feel as strong on the finger tips as on the palm of the hand, due to there being a larger concentration of the Pacinian corpuscle in the hand.

Ultrasound haptic feedback systems create a vibro-tactile sensation upon the skin of a user of the system. The focused ultrasound creates enough force at the point of intersection to slightly displace the skin of a user. Typically, ultrasound haptic feedback systems use ultrasound with a frequency at or above 40 kHz, which is above the threshold for receptors in the skin to feel. Therefore, a user can only detect the onset and cessation of such focused ultrasound. In order to provide a sensation that is detectable by the receptors in skin, the focused ultrasound is modulated at a lower frequency, within the detectable range of the receptors. This range is typically from 1 Hz to 500 Hz.

When creating a system with mid-air tactile feedback, it is important to select the correct frequency of vibration for the part of skin that is being targeted. For example, if the hand is targeted, a vibration frequency of 110 Hz is a good choice as it can be felt across all parts of the hand, albeit to varying degrees of strength.

B. Transmitting Ultrasound Signals for Haptic Feedback

Tactile sensations on human skin can be created by using a phased array of ultrasound transducers to exert an acoustic radiation force on a target in mid-air. Ultrasound waves are transmitted by the transducers, with the phase emitted by each transducer adjusted such that the waves arrive concurrently at the target point in order to maximize the acoustic radiation force exerted.

By defining one or more control points in space, the acoustic field can be controlled. Each point can be assigned a value equating to a desired amplitude at the control point. A physical set of transducers can then be controlled to create an acoustic field exhibiting the desired amplitude at the control points.

A side effect of this technique is that the ultrasound breaks down and creates a sound at the modulation frequency. Therefore, when creating tactile feedback with a 200 Hz modulation frequency, a 200 Hz sound is also produced. This audible sound may be annoying to users and can be a barrier to ultrasound haptic technology being adopted.

The optimal conditions for producing an acoustic field of a single frequency can be realized by assigning activation coefficients to represent the initial state of each transducer. However, in order to create haptic feedback, the field can be modulated with a signal of a potentially lower frequency. For example, an acoustic field of 40 kHz may be modulated with a 200 Hz frequency in order to achieve a 200 Hz vibro-tactile effect. Methods to generate this vibro-tactile effect may reduce audible content by smoothly interpolating the transducer activation coefficients between discrete and disjoint sets of control points, resulting in smooth sinusoidal amplitude variations at the control point locations. These sinusoidal amplitude variations cause a pure tone to be generated. A pure tone, although much lower in perceptual loudness than the disparate frequency content caused by abruptly changing the state of the transducers, remains audible.

It is known that the modulation waveform can be shaped to reduce the volume of the audible noise that is created (as described for example in UK Patent Application No. 1415923.0). In general, reducing and avoiding sharp changes in pressure level at the focus will reduce the loudness of the audible sound. For example, modulation with a pure square wave will produce a louder audible sound than modulation with a pure sine wave.

Further, in this acoustic field, one or more control points can be defined. These control points can be amplitude modulated with a signal and as a result produce vibro-tactile feedback in mid-air. An alternative method to produce feedback is to create control points that may not be modulated in amplitude and instead move them around spatially to create spatio-temporal modulation that can be felt. Both methods may be then used separately or together in order to produce sound and different textures.

II. Creating Uniform Feeling in a Haptic System

A. Steps to Create Optimized Haptic Feedback

The steps to create optimized haptic feedback using multiplexed frequencies include the following:

1. Knowing the distribution and frequency response range of receptors in the skin, create uniformly perceivable feedback.

2. Selecting a frequency that is in the range of all receptors.

3. Optimizing the vibration frequencies to not just be perceivable, but the best possible vibration frequency for a strong or high quality feeling.

4. Dynamically adjusting the vibration frequency to always be at the optimal frequency.

5. Multiplexing multiple frequencies to create a vibration that provides an optimum level of strength and quality across the whole target area.

B. Optimization of Haptic Feedback

In order to optimize the quality and perceived strength of the feedback, it is possible to dynamically vary the vibration frequency as the interaction is carried out. For example, in the situation of a tactile threshold, where a hand passes through some fixed plane and has a line of vibration created at the intersection of the hand and that plane, the frequency of the vibration can be adjusted in real time to optimize for the area of the hand currently being vibrated. One possibility is that the fingers receive a 100 Hz vibration while the center of the palm receives a 200 Hz vibration.

This dynamic adjustment is also possible with multiple points of feedback. For example a mid-air array of buttons could be represented by one localized point of vibration in the air for each button. As a hand moves over the array of buttons to explore their position and orientation, the vibration frequency of each button could adjust in real time to match the optimum frequency for the part of the hand it is targeted at.

There are also many situations where dynamic adjustment is not possible or not desirable. For example, the tracking system may not be sophisticated to determine discrete parts of the hand or the required processing power may be too high.

In these situations, it may be possible to multiplex frequencies to provide some uniform coverage across the area of skin being targeted. For example, when targeting a hand, a point of feedback could be multiplexed with both 100 Hz and 200 Hz. The palm would respond strongly to the 200 Hz component while the finger tips would respond strongest to the 100 Hz component. In so doing, a point of feedback that can be uniformly felt across the hand is established.

III. Creating Distinct Shapes and Corners

Using vibrations to generate mid-air haptic shapes leads to difficulties with corners. Haptic edge detection has been shown to require highly localized skin displacement (stretching) and at the ultrasonic frequencies currently used this is not possible. Edges can be reliably detected, but corners are not large enough features to be easily recognizable.

The use of points of high pressure in the ultrasonic field convey vibrations and are called "control points." They provide local feedback in an area around a wavelength in a small diameter (such as 8.6 mm @ 40 kHz). The control points may be arranged in 3D space programmatically to create the feeling of a shape in space.

There is a de facto maximum density for control points of about two wavelengths (~2 cm @ 40 kHz) apart, as diminishing returns in fidelity are exchanged for increased noise. This means that when using the curvature-dependent control point density, edge fidelity must be sacrificed in order for corner points to be noticeable. In many situations, even this is not enough to render corners in haptic shapes distinguishable.

To enhance corners, it is possible to warps the edges of the shape inwards to emphasize corners in space, creating a haptic representation accentuated in a fashion that enables the perception of corners from spatial cues.

Turning to FIG. 1, shown in the left box 10 is a shape without corner-enhancing warping. Shown in the center box 20 of FIG. 1 is a corner-enhancing warp function applied to highlight the corners haptically. Shown in the right box 30 of FIG. 1 is a function where further warping has been applied, showing that the effect is tunable depending on the circumstances and the effect desired.

Once the shape warping has been achieved, other techniques for enhancing corners can also be used. Specifically, the curvature dependent control point density and the rotation of the points in time may be altered to produce a desired effect. This shape warping may be applied to sections of 3D geometry to create haptic 3D geometry with distinct corners to increase haptic fidelity. This may also be applied as a process to highlight salient features in shapes for attracting attention.

IV. Creating Pulsing Points

Due to awareness of the de facto limit of control point definition and density, it is possible to create pulsing points that are haptically pleasing. By forcing control points close together, they merge and become a smaller, weaker vibration. By rotating them and bringing them closer and further apart, a localized pulsing sensation can be generated that can haptically give a standby or ready prompt.

Figure 2:
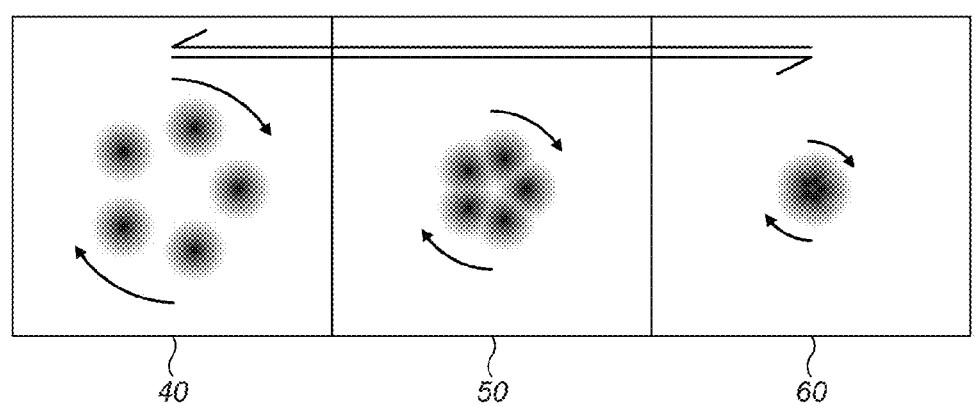
FIG. 2 is an illustration of an example series of five haptic control points simultaneously produced in the plane of interaction.

Turning to FIG. 2, shown is an illustration of an example series of five control points simultaneously produced in the plane of interaction. The points in the figure have a diameter of a wavelength. The five points spin quickly so they are not distinguishable. In the left panel 40 of FIG. 2, the five points spin and are far enough apart for them to be perceived as a single large haptic point. The central panel 50 shows that as the points orbit closer together the haptic point shrinks and becomes weaker. In the right panel 60, the five control points have merged to become a single control point. The process is then reversed to increase the size and strength of the haptic point and this system is then cycled to generate a pulsing sensation. This results in a point which feels larger and smaller with time to produce a haptically pleasing pulsing effect. As such, FIG. 2 shows a set of points, spinning in a circle with the diameter of the circle growing smaller/bigger over time. An alternative method to the spinning circle is to move the focus between two locations.

Figure 3:
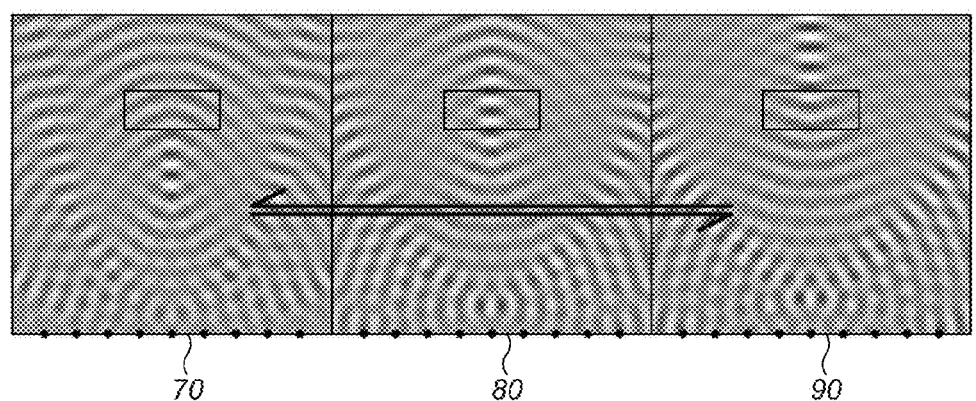
FIG. 3 is a selection of acoustic field simulations where in the control point is moved through the plane of interaction.

Turning to FIG. 3, shown is a selection of acoustic field simulations where in the control point is moved through the plane of interaction (shown approximately by the inset black bordered box). The small filled black circles along the bottom edge of each figure represent transducer elements that have been configured to reproduce a control point. In the left panel 70 the control point is created below the plane of interaction, resulting in no focusing in the interaction space. As the focus moves up, the interaction space contains the control point as shown in the central panel 80. Finally, in the right panel 90 the focus has moved up through and out of the interaction space. This process is then reversed and cycled to produce the pulsing sensation. Thus, by moving the control point backwards and forwards through the inset box, a pulsing sensation can be produced throughout the central region. User detection in this scenario can be much more crude, e.g. a light sensor in the central area.

The objective as shown in these figures is to create a "pulsating" sensation. "Pulsating" is defined to be a sensation that grows both stronger/weaker and bigger/smaller over time. By comparison, a simple modulation only grows stronger/weaker over time.

Further, FIG. 3 shows one possible example, where the focus is linearly interpolated between two positions, one vertically below the interaction zone and the other vertically above. As the focus moves up and down, the sensation experienced in the interaction zone grows smaller/larger as the ultrasound focus is cone shaped (in the figure, larger on the left image 70 and right image 90, smaller in the middle image 80). This also has the effect of making the sensation stronger/weaker as the strength drops off moving away from the optimal focus (shown in the middle image 80).

Moving the focus up and down through the interaction zone also has a benefit with the tracking system. Less accuracy is required in the vertical direction. As shown in FIG. 3, if interaction zone is moved up or down, it still experiences a sensation that grew bigger/smaller and stronger/weaker over time. This means that less accuracy in the vertical axis from the tracking system is needed, allowing for the use of a cheaper tracking system.

Alternatively, varying the focusing location can create a pulsing sensation. This has the effect of alternately focusing and defocusing the control point, which generates a lower fidelity pulsing. Although this is less effective, it may be potentially useful for situations in which a pre-baked, offline response that does not need active sensing is required.

V. Combining and Designing Audible and Haptic Feedback

A. Designing the Audible Feedback

As the audible sound is created by the modulation waveform, it is possible to design the sound that is produced. For example, rather than modulating the focused ultrasound with a pure waveform, modulating it with the waveform of a "click" sound will result in an audible "click" sound being produced. Thus, the modulation waveform can be designed and dynamically changed to produce any audible sound.

When using focused ultrasonic carrier waves, the audible sound is produced most intensely at the focus and is directional. To the user, this means the sound appears to originate from the focus. This may be of great use in a haptic system. For example, a mid-air button may be created by focusing the ultrasound onto the user's fingertip. The ultrasound can then be modulated with the waveform of a "click" sound. The user would perceive both a haptic click sensation and an audible "click" sound originating from their finger tip. Thus, both the haptic and audio feedback are created at the same location in mid-air.

B. Separating Audio and Haptic Feedback

The modulation waveform that provides the optimum haptic feedback will often differ from that which provides the optimum audible sound. For example, a modulation waveform that creates a pleasing "click" sound may provide a very weak tactile sensation or a modulation waveform that provides a strong tactile sensation may provide an annoying sound. When designing for a combination of haptic and audio feedback, it is therefore necessary to make trade-offs between the two.

A solution to this is to create multiple points of focus within the acoustic field. Each of the points can be purposed with either creating a haptic effect or creating audible feedback. In the simple button click example, one point can be positioned on the fingertip to create the haptic effect, while another can be positioned elsewhere in the acoustic field to create the audible sound. In this scenario, the audible point would be positioned to avoid contact with the user, and thus would not be able to be felt.

C. Auditory Masking of the Haptic Effect by the Auditory Sound

Auditory masking of a sound occurs when the perception of one sound is affected or covered up by another sound. As the sound from the focused ultrasound is directional, the audible point can be positioned anywhere along the path between the transducers and the user's head or ear where it would then maximize the perceived volume of that sound. By contrast, the audible sound created by the haptic point would be reflected off the finger and away from the user. It would therefore be perceived as quieter. Thus, the audible sound from the haptic point will be masked by the audible sound from the audible point and the user would only be able to hear the audible point.

Haptic and audible points can each have their own separate modulation waveforms. This allows each type of point to be modulated with the optimum waveform for their individually desired effect. Indeed, systems are not limited to having only two simultaneous points. It is possible to have many independent and simultaneous points of both haptic feedback and audible feedback.

VI. Spatio-Temporal Modulation in Haptic Systems

A. Absolute Phase Offset

In order to create smooth transitions between any two complex spaces of transducer activation coefficients they should differ as little as possible. All sets of transducer activation coefficients have one spare degree of freedom: their absolute phase relative to some other activation coefficient pattern. By tying both to some arbitrary gauge point—such as making both as zero phase offset as possible—this reduces to a minimum the frequency shifts in the transducers required to move between the two patterns.

Figure 4:
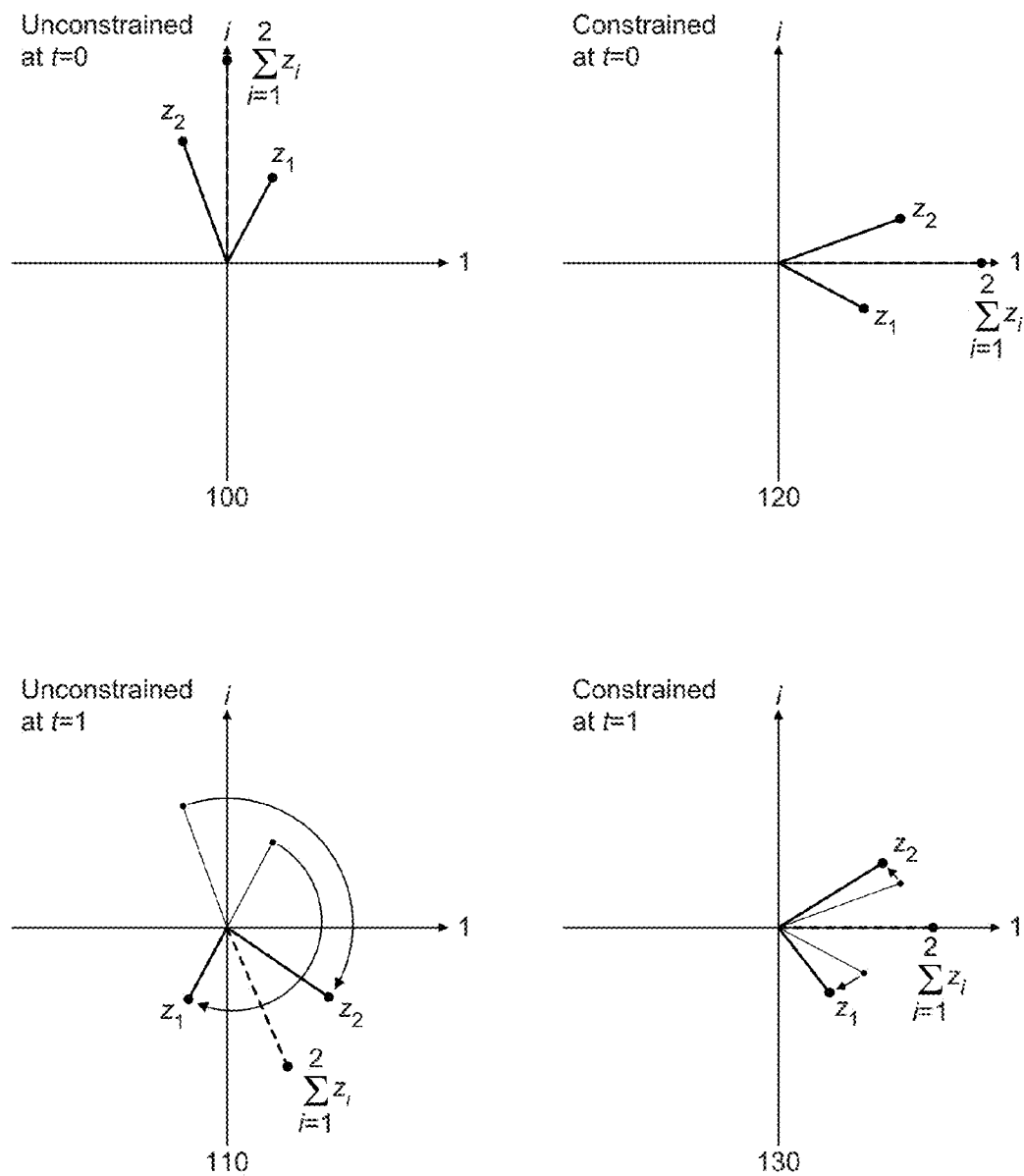
FIG. 4 is an illustrative view of unconstrained and constrained transducers.

This is illustrated in FIG. 4, which shows an illustrative array of two transducers. The focusing of this array is due to the relative phase offsets in the wave between both transducers, which is described by the angle between them. In the unconstrained example, on the left, the phase at time t=0 100 has to change considerably in order to reach the complex activation coefficients defined for time t=1 110. This induces transient behavior, frequency shifting and power inefficiency when scaled across many transducers. In the constrained example on the right however, the sum of the transducer coefficients has been constrained to the real line at t=0 120 and t=1 130, facilitating a small change in angle to obtain the appropriate relative phase.

Summing the complex-valued transducer activation coefficients of any particular pattern can be used to produce an average. Once computed, the complex conjugate of this average can be taken and made into a unit amplitude complex value. Then by multiplying each transducer activation coefficient with this value, the average phase offset becomes zero. This uses the spare degree of freedom to linearly minimize the changes experienced by each transducer, pushing the differences between the complex phase spaces of the transducer activation coefficients for infinitesimally different patterns towards zero, a key necessity for reducing abrupt changes in the acoustic field and transducer power consumption generally.

B. Spatio-Temporal Modulation of Points, Lines and Shapes

Creating and destroying control points (increasing amplitude from or decreasing amplitude to zero) is associated with noise as the amplitude varies. To maximally reduce noise, non-modulated control points may be created and move around on sets of curve pieces defined parametrically. While non-modulated control points will maximally reduce noise, "less modulated" control points may also reduce noise to a lesser extent (that is modulating the amplitude between 0.5-1 rather than 0-1).

The defined curves will either be closed, where the points will circulate continuously on the curve, or open, where the points will reverse direction. Alternatively, the points may "disappear" upon reaching the end of the curve. When multiple points highlight a single open curve it may be useful for them to swap positions when they become close enough to be perceived as a single point to prevent any perceptual or physical drop in output.

This open or closed path curve, which may be implemented as a three-dimensional spline curve, is the fundamental building block of a system for creating spatio-temporally modulated feedback. Many of these curves running through three-dimensional space may function as contours and be used to create the impression of a shape or surface. A circular path with very small radius may be used to create the impression of a point.

Since this technique requires less focusing time to produce the same response, larger areas may be haptically actuated. For instance, 'painting' an area using a control point may be used to create a wider region in space that can be felt to stimulate more receptors in the skin.

Due to the wide area that can be actuated, feedback may be removed from places to create an impression of the negative space. For instance, a circle with a piece missing may be created to represent a haptic fiducial or generate an area of feeling with a conspicuously missing region. By emitting haptics around a space, an area may be highlighted without having to require it to be felt directly, for instance when the area in question must be kept clear of hands or limbs for visibility reasons.

C. Parametric Sound from a Control Point

The haptic sensation from the control point is generated through the action of the spatio-temporal strobe effect. Since the source of the haptic effect is distinct and different from amplitude modulation, amplitude modulation may be used with non-haptic audible content while also creating high-quality haptic sensation at the same time in the same point, line or shape.

The ultimate goal of the technology is to produce a silent operation. Audible output is correlated with temporal changes in the acoustic field, which must therefore be as smooth and reduced as possible. To create this effect, it is possible to move the control points of the ultrasonic focused patterns around smoothly using high speed updates (preferably greater than 2 kHz) to produce sensations at target points, lines and shapes rather than creating them unchanging in time with much higher intensity ultrasonic devices or manipulating their amplitude in time.

Modulating in this manner may use much lower strobing frequencies than would be expected by simply considering mechanoreceptors or the density of focused power in time. Therefore, combining both spatio-temporal and amplitude modulation of control points at once can also be used produce stronger haptic feedback. Different rhythms of control point motion may also be used to provide different textures, and thus the amplitude modulation can provide texture to the spatio-temporally modulated control points or vice versa.

VII. Frequency Control Using Self-Intersecting Curves

Creating a point and moving it without modulating in amplitude may haptically actuate a path in the air. By making the point follow a path repeatedly at a given speed and a constant frequency, a haptic effect may be generated on the path in the air. Making the path longer increases the path distance and thus the speed needed for the point to achieve a given frequency. Consequently, this reduces the power density available for creating feedback. Multiple points may haptically actuate a path to create a more even distribution around the path at a given frequency. But this reduces the power that can be brought to bear at these points. A further significant limitation is that the path must be closed or audible sound will result due to the discontinuities involved in open paths, such as for instance, a distinct point or line segment.

One way to overcome these issues is to slow or accelerate the points as they move along a curve. However, when used with spatio-temporal modulation this has limitations both in that the frequency cannot be different for different points along the path, and that if the point slows too greatly it becomes less perceptible as it moves out of the range of frequencies perceptible haptically. Conversely, if the point moves too quickly along its path, it can create further air disturbances and thus audible noise.

Instead of simply changing the speed of the points, an increase in the amount of power at given points on the path can be realized through the construction of a self-intersecting curve that crosses over itself one or more times in space. In the local neighborhood of the intersection points, harmonics of the base path frequency can be expressed. This change in the frequency behavior also increases the power at the crossing point, enabling a rich palette of behaviors to be realized in the crossing region that are in contrast to other locations along the path. This intersection may also be engineered to make only the intersection within the detectable frequency range of human touch, or only the intersection outside the frequency range and thus haptically undetectable. It also enables both the specific and broad targeting of different mechanoreceptors in the skin. In many scenarios, the absence of haptic feedback in an area surrounded by haptic feedback may be felt more strongly than the feedback itself.

Multiple paths that intersect one or more times may also be created; this will produce a pattern of haptic cadence that embodies a particular rhythm or texture. This does not necessarily mean that the path or paths should be repeatable or the crossing point of the curve at the same position each time. In some cases, due to the movement of the individually-considered points being too fast or weak to feel, it can be engineered such that the crossing point or points are haptically highlighted due to the self-intersection. In each case, these multiple crossing or self-intersecting curves may contain either or both point regions and path segments wherein the curves occupy the same space.

The points moving along the curves defined at a precise location have a real physical size. The abstract notion of "curves" does not reflect the size of the points, so in many cases the abstract curves do not have to intersect, but instead the area of effect of the point merely has to be overlapping to realize an increase in average power and frequency. Due to this, a set of paths or self-intersecting curves can potentially lead to unanticipated haptic results. Therefore, the produced haptic patterns may be best visualized using a frequency/occupancy graph and such a frequency/occupancy graph can be transformed to and from a representative haptic curve.

VIII. Conclusion

The various features of the foregoing embodiments may be selected and combined to produce numerous variations of improved haptic-based systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:
1. A method comprising:
   i) producing an acoustic field from a transducer array having known relative positions and orientations;
   ii) defining a plurality of control points wherein each of the plurality of control points has a known spatial relationship relative to the transducer array;

iii) assigning an amplitude to each of the plurality of control points; and iv) moving the plurality of control points within the acoustic field while adjusting the changes experienced within the acoustic field so that the changes fall under a predetermined threshold.

2. The method as in claim 1, wherein the acoustic field is produced by a mid-air haptic feedback system.

3. The method as in claim 2, wherein the step of moving the plurality of control points creates a smooth transition by using an average phase offset that is substantially zero.

4. The method as in claim 2, wherein the step of moving the plurality of control points occurs on a set of defined curves.

5. The method as in claim 4, wherein the defined curves are spline curves.

6. The method as in claim 5 wherein the spline curves are defined to simulate the impression of a 3-dimensional surface in haptic feedback.

7. The method as in claim 6, wherein the haptic feedback includes a conspicuously absent haptic region within the 3-dimensional surface.

8. The method as in claim 2, further comprising modulating the control points using amplitude modulation.

9. The method as in claim 8, wherein the amplitude modulation produces substantially different haptic feedback than the haptic feedback produced by step iv.

10. A process for creating haptic feedback, comprising:
identifying the range of the receptors in a perceiving member to create substantially uniformly perceivable feedback, wherein the perceiving member is part of the human body;
selecting at least one vibration frequency that is in the range of the receptors in the perceiving member; and
dynamically altering the at least one vibration frequency to create substantially uniformly perceivable feedback throughout the receiving member.

11. The process as in claim 10, wherein the step of dynamically altering the at least one vibration frequency occurs in a mid-air haptic feedback system.

12. The process as in claim 11, wherein the step of dynamically altering the at least one vibration frequency comprises multiplexing a plurality of frequencies.

13. The process as in claim 11, wherein the perceiving member is a human hand.

14. The process as in claim 13, wherein the wherein the step of dynamically altering the at least one vibration frequency comprises adjusting the at least one vibration frequency to target a specific portion of the human hand.

15. The process as in claim 14, where the step of adjusting the at least one vibration frequency comprises a vibration of about 100 Hz to target the palm of the human hand and a vibration of about 200 Hz to target the fingertips of the human hand.

16. A method comprising:
i) producing an acoustic field from a transducer array having known relative positions and orientations;
ii) defining a plurality of control points wherein each of the plurality of control points has a known spatial relationship relative to the transducer array;
iii) assigning an amplitude to each of the plurality of control points; and
iv) creating an enhanced shape effect by:
a) defining a real-world shape having a plurality of shape corners and a plurality of shape edges to be replicated via haptic feedback within the acoustic field; and
b) adjusting the plurality of control points to modify the haptic feedback of the real-world shape by increasing the haptic feedback of the plurality of shape corners.

17. The method as in claim 16, wherein the step of producing an acoustic field from a transducer array creates a mid-air haptic feedback system.

18. The method as in claim 17, further comprising dynamically altering the amplitude of the plurality of the control points.

19. The method as in claim 17, wherein the step of adjusting the plurality of control points comprises altering the proximity between the plurality of control points to enhance the haptic feedback of the replication of the plurality of shape edges.

20. The method as in claim 17, wherein the step of adjusting the plurality of control points comprises altering the location of the plurality of control points to enhance the haptic feedback of the replication of the plurality of shape edges.

21. A method comprising:
i) producing an acoustic field from a transducer array having known relative positions and orientations;
ii) defining a plurality of control points wherein each of the plurality of control points has a known spatial relationship relative to the transducer array;
iii) assigning an amplitude to each of the plurality of control points; and
iv) modulating the acoustic field associated with at least one of the plurality of control points to produce a desired audible sound.

22. The method as in claim 21, wherein the acoustic field is produced by a mid-air haptic feedback system.

23. The method as in claim 22, wherein the desired audible sound is perceived to be originating from the at least one of the plurality of control points.

24. The method as in claim 22, further comprising modulating the acoustic field associated with at least one of the plurality of control points to produce localized haptic feedback in the same general location as the desired audible sound.

25. The method as in claim 24, wherein the localized haptic feedback is separated from the desired audible sound wave so that the desired audible sound produces perceivable haptic feedback below a preset threshold.

26. The method as in claim 24, wherein the desired audible sound is perceived by a user to be louder than the audible sound produced by the localized haptic feedback.

27. A method comprising:
i) producing an acoustic field from a transducer array having known relative positions and orientations;
ii) defining a first focus point having a known spatial relationship relative to the transducer array;
iii) assigning an amplitude to the first focus point; and
iv) moving the first focus point such that the path of the focus point crosses over itself at least one time within the acoustic field.

28. The method as in claim 27, wherein the acoustic field is produced by a mid-air haptic feedback system.

29. The method as in claim 28, further comprising:
v) defining a second focus point having a known spatial relationship relative to the transducer array;
vi) assigning an amplitude to the second focus point; and
vii) moving the second focus point such that the path of the second focus point crosses over the path of the first focus point at least one time within the acoustic field.

30. The method as in claim 29 wherein the step of moving the first focus point and the second focus point within the acoustic field uses harmonics of the base path frequency.

31. The method as in claim 30 wherein the spaces where the path of the first control point crosses over the path of the second control point within the acoustic field produces substantially increased haptic feedback when compared with other spaces within the acoustic field.

* * * * *